United States Patent
Liu et al.

(10) Patent No.: US 11,419,111 B2
(45) Date of Patent: Aug. 16, 2022

(54) DATA TRANSMISSION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Jianhua Liu, Guangdong (CN); Ning Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 341 days.

(21) Appl. No.: 16/624,017

(22) PCT Filed: Jul. 17, 2017

(86) PCT No.: PCT/CN2017/093225
§ 371 (c)(1),
(2) Date: Dec. 18, 2019

(87) PCT Pub. No.: WO2019/014818
PCT Pub. Date: Jan. 24, 2019

(65) Prior Publication Data
US 2020/0112954 A1    Apr. 9, 2020

(51) Int. Cl.
*H04W 72/04* (2009.01)
*H04W 76/27* (2018.01)
(Continued)

(52) U.S. Cl.
CPC ....... *H04W 72/0446* (2013.01); *H04L 5/0082* (2013.01); *H04W 72/0453* (2013.01); *H04W 76/27* (2018.02); *H04W 80/02* (2013.01)

(58) Field of Classification Search
CPC ......... H04W 72/0446; H04W 72/0453; H04W 76/27; H04W 80/02; H04L 5/0082
See application file for complete search history.

(56) References Cited

U.S. PATENT DOCUMENTS

2015/0156671 A1    6/2015   Kuchibhotla et al.
2015/0288490 A1    10/2015  Sun et al.
(Continued)

FOREIGN PATENT DOCUMENTS

CN    102811486 A    12/2012
CN    103838376 A    6/2014
(Continued)

OTHER PUBLICATIONS

U.S. Appl. No. 62/521,183, filed Jun. 16, 2017. (Year: 2017).*
(Continued)

*Primary Examiner* — Melvin C Marcelo
(74) *Attorney, Agent, or Firm* — Young Basile Hanlon & MacFarlane, P.C.

(57) ABSTRACT

A data transmission method, a terminal device and a network device are provided. The method includes: a terminal device receives first indication information, wherein the first indication information includes information of multiple time domain resources, and frequency points used for data transmission on different time domain resources in the multiple time domain resources are different; and the terminal device performs data transmission on the multiple time domain resources based on frequency points corresponding to the multiple time domain resources.

20 Claims, 10 Drawing Sheets

(51) Int. Cl.
*H04L 5/00* (2006.01)
*H04W 80/02* (2009.01)

(56) References Cited

U.S. PATENT DOCUMENTS

2020/0163095 A1* 5/2020 Kim .................. H04W 76/15
2020/0229177 A1* 7/2020 Zou .................. H04W 72/042

FOREIGN PATENT DOCUMENTS

| CN | 105991498 A | 10/2016 |
|----|----|----|
| EP | 3306995 A1 | 4/2018 |
| JP | 2017508423 A | 3/2017 |
| RU | 2407230 C2 | 12/2010 |
| WO | 2013181810 A1 | 12/2013 |
| WO | 2014117358 A1 | 8/2014 |
| WO | 2017004757 A1 | 1/2017 |

OTHER PUBLICATIONS

Canada first office action for CA Application 3,064,473 dated Jan. 18, 2021. (5 pages).
Chile First Office Action with English Translation for CL Application 201903698 dated Jan. 19, 2021. (26 pages).
3GPP TS 36.331 V13.0.0 (Dec. 2015); Technical Specification 3rd Generation Partnership Project; Technical Specification Group Radio Access Network; Evolved Universal Terrestrial Radio Access (E-UTRA); Radio Resource Control (RRC); Protocol specification (Release 13).
3GPP TS 36.423 V13.2.0 (Dec. 2015) Technical Specification 3rd Generation Partnership Project; Technical Specification Group Radio Access Network; Evolved Universal Terrestrial Radio Access Network (E-UTRAN); X2 application protocol (X2AP) (Release 13).
Singapore Invitation to Respond to Written Opinion for SG Application 11201910922W dated Aug. 16, 2021. (7 pages).
European search report issued in corresponding European application No. 17978324.9 dated Mar. 31, 2020.
Chinese First Office Action with English Translation for CN Application 202010068630.8 dated May 10, 2021. (20 pages).
Indian Examination Report for IN Application 201917054311 dated May 19, 2021. (6 pages).
NEC, Frequency hopping for NR UL PUSCH, 3GPP TSG RAN WG1 NR Ad-HOC#2, R1-1710247, Jun. 27-30, 2017. (3 pages).
Japanese Office Action with English Translation for JP Application 2019-564071 dated Jun. 11, 2021. (6 pages).
Russia Non-Final Rejection with English Translation for RU Application 2019139968 dated Sep. 8, 2020.
Communication pursuant to Article 94(3) EPC Examination for EP Application 17918324.9 dated Sep. 10, 2020.
Chile Office Action with English Translation for CL Application 2019-003698 dated Oct. 21, 2021. (33 pages).
Korean Office Action with English Translation for KR Application 10-2019-7034124 dated Dec. 22, 2021. (8 pages).
Taiwan Office Action with English Translation for TW Application 107124608 dated Oct. 26, 2021. (10 pages).
Israel Office Action with English Translation for IL Application 270845 dated Mar. 22, 2022. (4 pages).

* cited by examiner

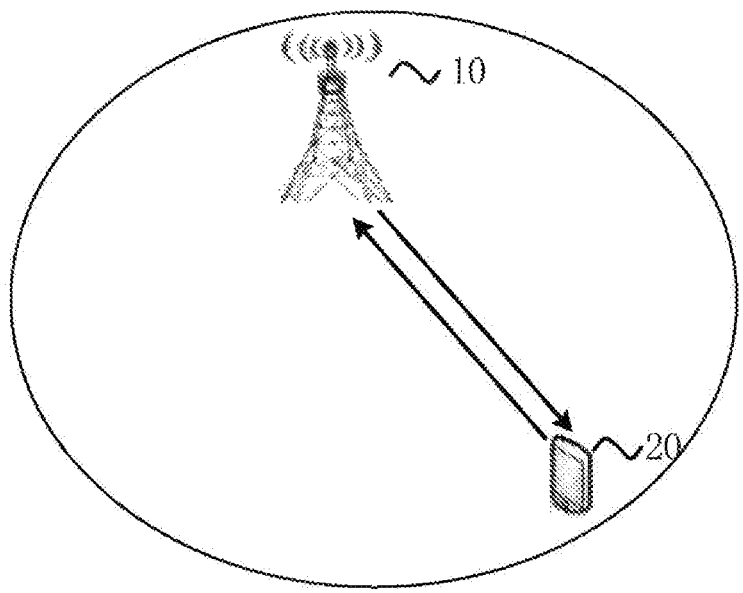

FIG. 1

A terminal device receives first indication information, wherein the first indication information includes information of multiple time domain resources, wherein frequency points used for data transmission on different time domain resources in the multiple time domain resources are different ~ 210

The terminal device performs data transmission on the multiple time domain resources based on frequency points corresponding to the multiple time domain resources ~ 220

FIG. 2

DATA TRANSMISSION METHOD, TERMINAL DEVICE, AND NETWORK DEVICE

CROSS-REFERENCE TO RELATED APPLICATION(S)

This application is a 371 application of International Application No. PCT/CN2017/093225, filed on Jul. 17, 2017, the entire disclosure of which is hereby incorporated by reference.

TECHNICAL FIELD

Implementations of the present application relate to the field of wireless communication, and more particularly, relate to a data transmission method, a terminal device, and a network device.

BACKGROUND

In a communication system, if it is supported that a terminal device transmits data on two different frequency points, the terminal device needs to have a capability to send and receive data on the two frequency points. For example, the terminal device has two sets of independent radio frequency transceiving units, or the terminal device has a set of radio frequency transceiving unit with sufficient bandwidth to be capable of receiving or sending data on two frequency points. However, this will lead to increase in the hardware cost of the terminal and increase in power consumption of the terminal device.

SUMMARY

Implementations of the present application provide a data transmission method, a terminal device and a network device.

In a first aspect, there is provided a data transmission method. The data transmission method includes: a terminal device receives first indication information, wherein the first indication information includes information of multiple time domain resources, wherein frequency points used for data transmission on different time domain resources in the multiple time domain resources are different; and the terminal device performs data transmission on the multiple time domain resources based on frequency points corresponding to the multiple time domain resources.

In a possible implementation, the multiple time domain resources are alternately distributed on time domain.

In a possible implementation, the information of the multiple time domain resources includes starting positions of the multiple time domain resources on time domain.

In a possible implementation, the multiple time domain resources constitute one time domain period, and the information of the multiple time domain resources includes a length of the time domain period and relative positions of the multiple time domain resources in the time domain period.

In a possible implementation, a time domain length of each time domain resource in the multiple time domain resources is same or different.

In a possible implementation, each time domain resource in the multiple time domain resources includes multiple time domain units, and the time domain unit includes any one of a radio frame, a subframe, a time slot, a symbol, a transmission time interval.

In a possible implementation, multiple frequency points corresponding to the multiple time domain resources include a frequency point of a serving cell and/or a frequency point of a non-serving cell of the terminal device.

In a possible implementation, the multiple time domain resources include a first time domain resource and a second time domain resource, the first time domain resource is used for data transmission between the terminal device and a first network device based on a first frequency point, the second time domain resource is used for data transmission between the terminal device and a second network device based on a second frequency point, and there is an overlapping time domain resource between the first time domain resource maintained by the first network device and the second time domain resource maintained by the second network device.

Performing, by the terminal device, the data transmission on the multiple time domain resources based on frequency points corresponding to the multiple time domain resources, includes: the terminal device performs data transmission with the first network device on the first time domain resource maintained by the first network device based on the first frequency point, and prohibits data transmission with the second network device on the overlapping time domain resource based on the second frequency point; or the terminal device performs data transmission with the second network device on the second time domain resource maintained by the second network device based on the second frequency point, and prohibits data transmission with the first network device on the overlapping time domain resource based on the first frequency point.

In a possible implementation, the method further includes: the terminal device receives second indication information, wherein the second indication information is used for indicating information of the overlapping time domain resource.

In a possible implementation, the information of the overlapping time domain resource includes a position and/or a time domain length of the overlapping time domain resource.

In a possible implementation, the data transmission includes data reception and/or data sending.

In a possible implementation, receiving, by the terminal device, the first indication information includes: the terminal device receives the first indication information through a radio resource control (RRC) signaling, a medium access control (MAC) signaling, or a physical layer signaling.

In a possible implementation, the information of the multiple time domain resources is determined according to at least one of: dedicated information of the terminal device, a bearer type, and a logical channel type.

In a possible implementation, the multiple time domain resources and/or the overlapping time domain resource are determined through negotiation between multiple network devices communicating with the terminal device.

In a second aspect, there is provided a data transmission method. The data transmission method includes: a network device determines information of multiple time domain resources, wherein frequency points used for data transmission on different time domain resources in the multiple time domain resources are different; and the network device sends first indication information to a terminal device, wherein the first indication information includes the information of the multiple time domain resources, so that the terminal device performs data transmission on the multiple time domain resources based on frequency points corresponding to the multiple time domain resources.

In a possible implementation, the multiple time domain resources are alternately distributed on time domain.

In a possible implementation, the information of the multiple time domain resources includes starting positions of the multiple time domain resources on time domain.

In a possible implementation, the multiple time domain resources constitute one time domain period, and the information of the multiple time domain resources includes a length of the time domain period and relative positions of the multiple time domain resources in the time domain period.

In a possible implementation, a time domain length of each time domain resource in the multiple time domain resources is same or different.

In a possible implementation, each time domain resource in the multiple time domain resources includes multiple time domain units, and the time domain unit includes any one of: a radio frame, a subframe, a time slot, a symbol, a transmission time interval.

In a possible implementation, multiple frequency points corresponding to the multiple time domain resources include a frequency point of a serving cell and/or a frequency point of a non-serving cell of the terminal device.

In a possible implementation, the multiple time domain resources include a first time domain resource and a second time domain resource, the first time domain resource is used for data transmission between the terminal device and a first network device based on a first frequency point, the second time domain resource is used for data transmission between the terminal device and a second network device based on a second frequency point, and there is an overlapping time domain resource between the first time domain resource maintained by the first network device and the second time domain resource maintained by the second network device.

The network device is the first network device, and the method further includes: the first network device prohibits data transmission with the terminal device on the overlapping time domain resource based on the first frequency point, so that the terminal device performs data transmission with the second network device on the second time domain resource maintained by the second network device based on the second frequency point.

In a possible implementation, the method further includes: the network device sends second indication information to the terminal device, wherein the second indication information is used for indicating information of the overlapping time domain resource.

In a possible implementation, the information of the overlapping time domain resource includes a position and/or a time domain length of the overlapping time domain resource.

In a possible implementation, the data transmission includes data reception and/or data sending.

In a possible implementation, sending, by the network device, the first indication information includes: the network device sends the first indication information through a radio resource control (RRC) signaling, a medium access control (MAC) signaling, or a physical layer signaling.

In a possible implementation, determining, by the network device, the information of the multiple time domain resources includes: the network device determines the information of the multiple time domain resources according to at least one of: dedicated information of the terminal device, a bearer type, and a logical channel type.

In a possible implementation, the multiple time domain resources and/or the overlapping time domain resource are determined through negotiation between multiple network devices communicating with the terminal device, and the multiple network devices include the network device.

In a third aspect, there is provided a terminal device that may perform operations of the terminal device in the first aspect or any optional implementation of the first aspect. Specifically, the terminal device may include module units used for performing operations of the terminal device in the first aspect or any possible implementation of the first aspect.

In a fourth aspect, there is provided a network device that may perform operations of the network device in the second aspect or any optional implementation of the second aspect. Specifically, the network device may include module units used for performing operations of the network device in the second aspect or any possible implementation of the second aspect.

In a fifth aspect, there is provided a terminal device. The terminal device includes: a processor, a transceiver, and a memory. The processor, the transceiver, and the memory communicate with each other through an internal connection path. The memory is used for storing instructions, and the processor is used for executing the instructions stored in the memory. When the processor executes the instructions stored in the memory, the execution causes the terminal device to execute the method in the first aspect or any possible implementation of the first aspect, or the execution causes the terminal device to implement the terminal device provided in the third aspect.

In a sixth aspect, there is provided a network device. The network device includes: a processor, a transceiver, and a memory. The processor, the transceiver, and the memory communicate with each other through an internal connection path. The memory is used for storing instructions, and the processor is used for executing the instructions stored in the memory. When the processor executes the instructions stored in the memory, the execution causes the network device to execute the method in the second aspect or any possible implementation of the second aspect, or the execution causes the network device to implement the network device provided in the fourth aspect.

In a seventh aspect, there is provided a computer-readable storage medium storing a program that causes a terminal device to perform any one data transmission method in the above first aspect and various implementations thereof.

In an eighth aspect, there is provided a computer-readable storage medium storing a program that causes a network device to perform any one data transmission method in the above second aspect and various implementations thereof.

In a ninth aspect, there is provided a system chip, which includes an input interface, an output interface, a processor, and a memory, wherein the processor is used for executing instructions stored in the memory, and when the instructions are executed, the processor may implement the method in the first aspect or any possible implementation thereof.

In a tenth aspect, there is provided a system chip, which includes an input interface, an output interface, a processor, and a memory, wherein the processor is used for executing instructions stored in the memory, and when the instructions are executed, the processor may implement methods in the second aspect and any possible implementation thereof.

In an eleventh aspect, a computer program product containing instructions is provided. When the computer program product is run on a computer, the computer is caused to perform the method in the first aspect or any possible implementation thereof.

In a twelfth aspect, a computer program product containing instructions is provided. When the computer program product is run on a computer, the computer is caused to perform the method in the second aspect or any possible implementation thereof.

BRIEF DESCRIPTION OF DRAWINGS

FIG. 1 is a schematic diagram of architecture of an application scenario according to an implementation of the present application.

FIG. 2 is a schematic flowchart of a data transmission method according to an implementation of the present application.

DETAILED DESCRIPTION

Figure 3:
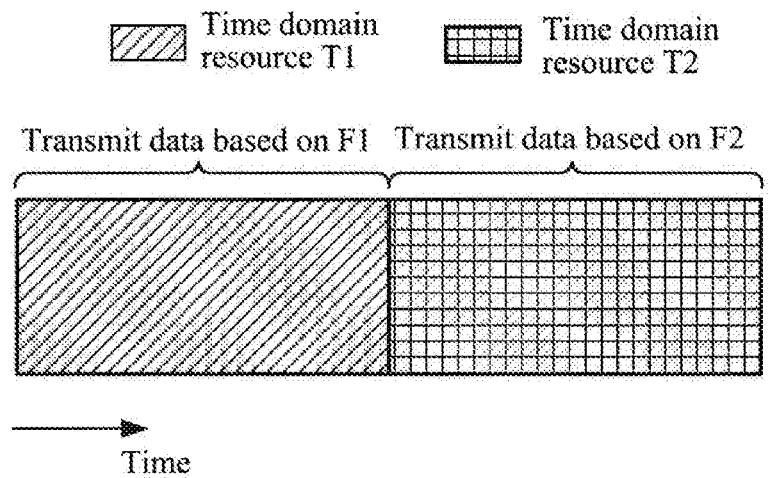
FIG. 3 is a schematic diagram of time domain resources corresponding to different frequency points according to an implementation of the present application.

Hereinafter, technical solutions in implementations of the present application will be described with reference to accompanying drawings.

It should be understood that the technical solutions of the implementations of the present application may be applied to various communication systems, such as a Global System of Mobile Communication (GSM), a Code Division Multiple Access (CDMA) system, a Wideband Code Division Multiple Access (WCDMA) system, a Long Term Evolution (LTE) system, a LTE Frequency Division Duplex (FDD) system, a LTE Time Division Duplex (TDD) system, a Universal Mobile Telecommunication System (UMTS), and a future 5G communication system.

Various implementations are described herein in connection with a terminal device in the present application. The terminal device may refer to a User Equipment (UE), an access terminal, a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device or other processing device connected to a wireless modem, a vehicle-mounted device, a wearable device, a terminal device in a future 5G network, or a terminal device in a future evolving Public Land Mobile Network (PLMN), etc.

Various implementations are described herein in connection with a network device in the present application. The network device may be a device for communicating with a terminal device, such as a base station (Base Transceiver Station, abbreviated as "BTS") in a GSM system or a CDMA system, a base station (NodeB, abbreviated as "NB") in a WCDMA system, or an evolved base station (Evolutional Node B, abbreviated as "eNB" or "eNodeB") in an LTE system, or the network device may be a relay station, an access point, a vehicle-mounted device, a wearable device, a network side device in a future 5G network, or a network side device in a future evolved PLMN network, etc.

FIG. 1 is a schematic diagram of an application scenario of an implementation of the present application. A communication system in FIG. 1 may include a network device 10 and a terminal device 20. The network device 10 is used for providing communication services for the terminal device 20 and is connected to a core network. The terminal device 20 may access the network by searching for a synchronization signal, or a broadcast signal, etc., sent by the network device 10, to communicate with the network. Arrows shown in FIG. 1 may represent uplink/downlink transmission through cellular links between the terminal device 20 and the network device 10.

The network in the implementation of the present application may refer to a Public Land Mobile Network (PLMN) or a Device-to-Device (D2D) network or a Machine-to-Machine/Man (M2M) network or other networks. FIG. 1 is a simplified schematic diagram of an example, and other terminal devices may be included in the network and are not shown in FIG. 1.

FIG. 2 is a schematic flowchart of a data transmission method according to an implementation of the present application. The method shown in the FIG. 2 may be performed by a terminal device which may be, for example, the terminal device 20 shown in the FIG. 1. As shown in FIG. 2, the data transmission method includes the following acts 210-220.

In 210, a terminal device receives first indication information, wherein the first indication information includes information of multiple time domain resources, wherein frequency points used for data transmission on different time domain resources in the multiple time domain resources are different.

In 220, the terminal device performs data transmission on the multiple time domain resources based on frequency points corresponding to the multiple time domain resources.

Specifically, the terminal device receives indication information of the network device, and determines frequency points used for data transmission on different time domain resources according to information of multiple time domain resources in the indication information, so that data transmission is performed on the multiple time domain resources based on respective frequency points corresponding to the multiple time domain resources. In other words, the time domain resources used when the terminal device transmits data based on different frequency points are different.

Therefore, in the implementation of the present application, the terminal device can effectively transmit data based on different frequency points without increasing the hardware cost and power consumption of the terminal device.

It should be understood that the frequency point may be, for example, a center frequency of modulated signals, and a certain frequency point may be understood as a frequency range in which the frequency point is the center frequency. For example, if frequency intervals are all 200 KHz, there may be a total of 125 radio frequency bands, i.e., 890 MHz, 890.2 MHz, 890.4 MHz, 890.6 MHz, 890.8 MHz, 891 MHz, . . . , 915 MHz, divided according to the frequency intervals of 200 KHz. If the terminal device is capable of communicating with different access network devices, and signal frequencies used by different access network devices to transmit signals are different, the terminal device shall receive, based on different frequency points, signals of corresponding frequencies sent by different network devices. In the existing art, two sets of independent radio frequency transceiving units may be configured in the terminal device to receive or send signals of different frequencies, however, this will lead to increase in the hardware cost of the terminal and increase in the power consumption of the terminal device. In the implementation of the present application, time domain resources used when the terminal device receives or sends data based on different frequency points are different, therefore data transmission can be effectively performed based on different frequency points without increasing the hardware cost and power consumption of the terminal device.

Optionally, multiple time domain resources indicated by the first resource indication information are alternately distributed on the time domain.

For example, as shown in FIG. 3, taking two frequency points as an example, a terminal device transmits data on a time domain resource T1 based on a frequency point F1, and the terminal device transmits data on a time domain resource T2 based on a frequency point F2.

It should be understood that the time domain resource T1 and the time domain resource T2 may constitute one time domain period, and in each such time domain period, the terminal device may transmit data based on different frequency points in the same way. For example, the time domain resource T1 and the time domain resource T2 are both equal to one slot, then the time domain period is equal to one subframe (including two slots). The terminal device receives or sends data on the time domain resource T1 based on the frequency point F1 in the first time slot of each subframe, and receives or sends data on the time domain resource T2 based on the frequency point F2 in the second time slot of each subframe.

Optionally, each time domain resource in the multiple time domain resources includes multiple time domain units, and the time domain unit includes any one of a radio frame, a subframe, a time slot, a symbol, a Transmission Time Interval (TTI).

It should be understood that the data transmission in the implementation of the present application may include data reception, or data sending, or both of the data reception and the data sending. A network device may allocate time domain resources based on the data reception and the data sending respectively, and indicate a corresponding relationship between time domain resources and frequency points used for the data reception to a terminal device, and indicate a corresponding relationship between time domain resources and frequency points used for data sending. The network device may allocate time domain resources based on data reception and data sending at the same time, and indicate the corresponding relationship between time domain resources and frequency points used for data reception and sending to the terminal device.

It should be understood that in the implementation of the present application, when the terminal device performs data transmission based on different frequency points, the transmitted data may include service data, signaling data or other types of data. In other words, the data transmission described in the implementation of the present application may be the reception and sending of any type of data such as service data, control signaling, reference signals, which is not limited in the present application.

It should also be understood that the terminal device in the implementation of the present application may support data transmission on multiple frequency points. Description is made below by taking two frequency points F1 and F2 or four frequency points F1, F2, F3 and F4 as an example, but the present application is not limited thereto.

For example, as shown in FIG. 3, assuming that the terminal device may support data transmission on two frequency points F1 and F2, the network device indicates the terminal device to perform data transmission on the time domain resource T1 based on the frequency point F1, and perform data transmission on the time domain resource T2 based on the frequency point F2. The frequency point F1 and frequency point F2 are used alternately.

The first indication information may specifically indicate positions of multiple time domain resources corresponding to multiple frequency points in two modes. In Mode 1 and Mode 2, the time domain length of each time domain resource in the multiple time domain resources may be the same or different.

Mode 1: optionally, the information of the multiple time domain resources includes respective starting positions of the multiple time domain resources on time domain.

Figure 4:
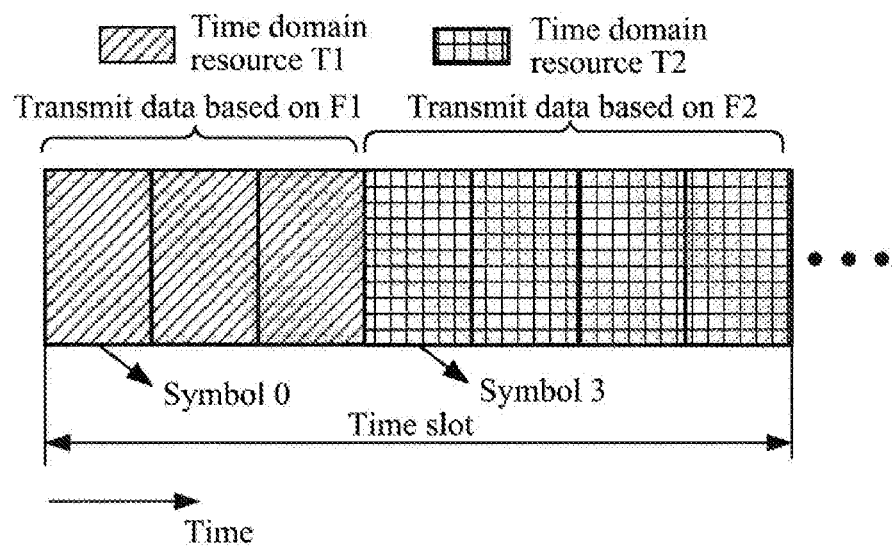
FIG. 4 is a schematic diagram of time domain resources corresponding to different frequency points according to an implementation of the present application.

For example, as shown in FIG. 4, the first indication information includes information of two time domain resources (T1 and T2), and the two time domain resources (T1 and T2) correspond to two frequency points (F1 and F2), respectively. The first indication information indicates starting positions of T1 and T2 on the time domain, for example, T1 starts from symbol 0 of each time slot and T2 starts from symbol 3 of each time slot.

Figure 5:
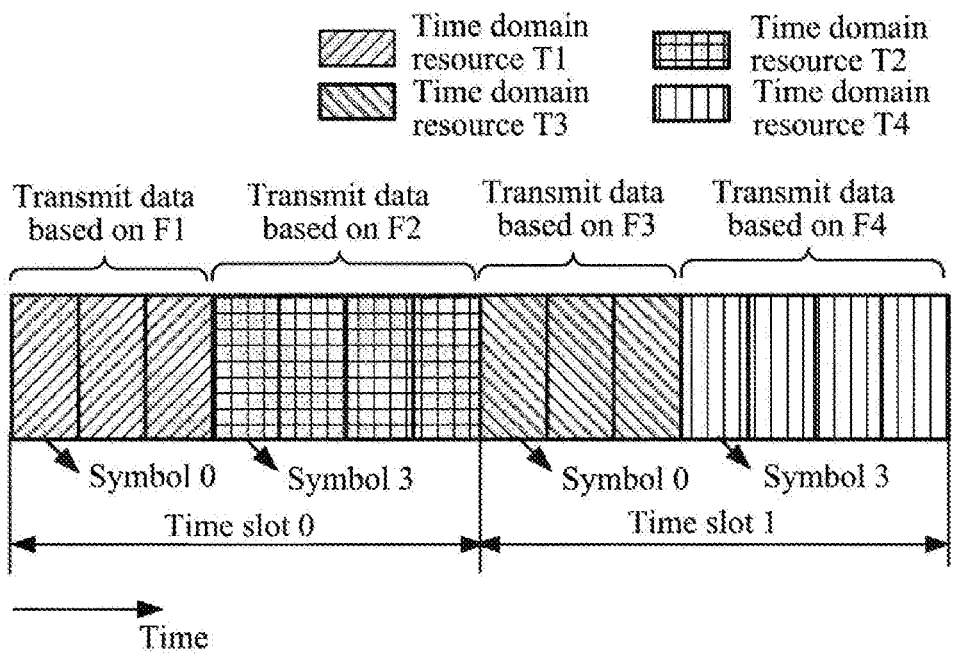
FIG. 5 is a schematic diagram of time domain resources corresponding to different frequency points according to an implementation of the present application.

For another example, as shown in FIG. 5, the first indication information includes information of four time domain resources (T1, T2, T3, and T4) corresponding to four frequency points (F1, F2, F3, and F4), respectively. The first indication information may indicate starting positions of T1, T2, T3, and T4 on time domain, for example, T1 starts from symbol 0 of the first time slot of each subframe, T2 starts from symbol 3 of the first time slot of each subframe, T3 starts from symbol 0 of the second time slot of each subframe, and T4 starts from symbol 3 of the second time slot of each subframe.

Mode 2: optionally, the multiple time domain resources constitute one time domain period, and the information of the multiple time domain resources includes a length of the time domain period and respective relative positions of the multiple time domain resources in the time domain period.

Optionally, if the lengths of the multiple time domain resources are not completely the same, the information of the multiple time domain resources may include respective lengths and respective time sequences of the multiple time domain resources.

Figure 6:
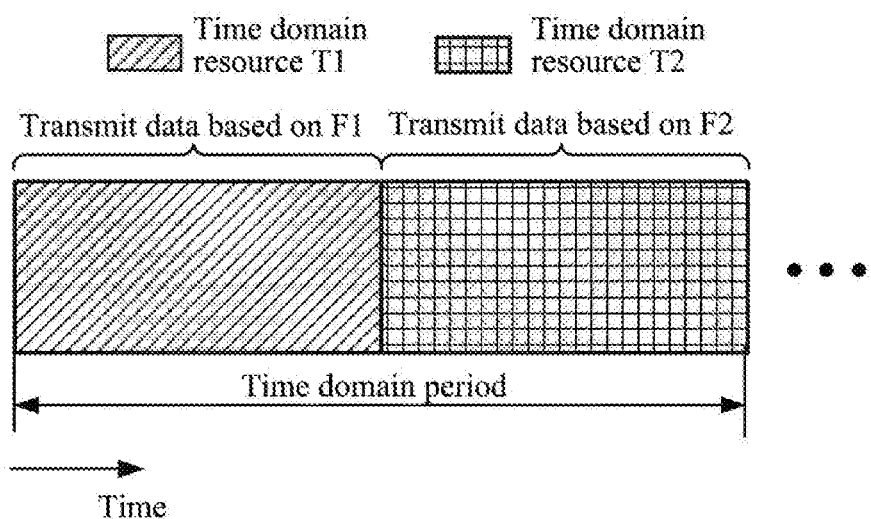
FIG. 6 is a schematic diagram of time domain resources corresponding to different frequency points according to an implementation of the present application.

For example, as shown in FIG. 6, the first indication information includes information of two time domain resources T1 and T2, time domain lengths of the time domain resource T1 and the time domain resource T2 are the same, and the time domain resource T1 and the time domain resource T2 constitute one time domain period. The time domain resource T1 occupies a first half of the time domain period, and the time domain resource T2 occupies a second half of the time domain period. The information of the two time domain resources in the first indication information includes a length of the time domain period and respective relative positions of the time domain resource T1 and the time domain resource T2 in the time domain period.

Figure 7:
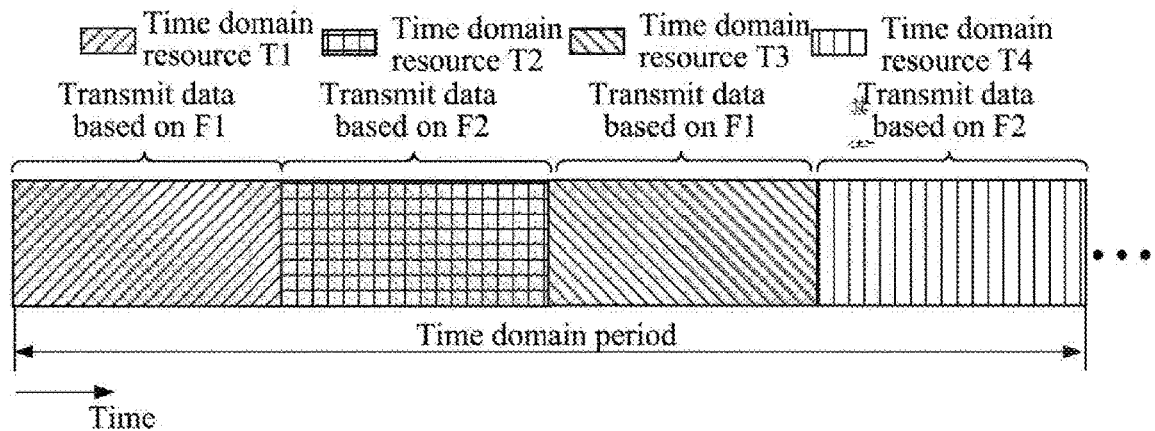
FIG. 7 is a schematic diagram of time domain resources corresponding to different frequency points according to an implementation of the present application.

For another example, as shown in FIG. 7, the first indication information includes information of four time domain resources, namely T1, T2, T3 and T4. Time domain lengths of the time domain resources T1 to T4 are the same, and the time domain resources T1 to T4 constitute one time domain period. For example, the length of the time domain period is equal to the length of two subframes, and a time sequence of the four time domain resources is T1, T2, T3 and T4. That is, time domain resource T1 and time domain resource T2 occupy a first subframe of the time domain period, such as subframe 0, and time domain resource T3 and time domain resource T4 occupy a second subframe of the time domain period, such as subframe 1, and the time domain resource T1 occupies a first slot, i.e., slot 0, in subframe 0, time domain resource T2 occupies a second slot, i.e., slot 1, in subframe 0, time domain resource T3 occupies the first slot, i.e., slot 0, in subframe 1, and time domain resource T4 occupies the second slot, i.e., slot 1, in subframe 1. The information of the four time domain resources in the first indication information includes a length of the time domain period and respective relative positions of the time domain resources T1 to T4 in the time domain period.

Optionally, multiple frequency points corresponding to the multiple time domain resources include a frequency point of a serving cell and/or a frequency point of a non-serving cell of the terminal device.

For example, as shown in FIG. 3, F1 may be a frequency point of a serving cell of the terminal device, and the terminal device performs data transmission with a network device in the serving cell based on the frequency point F1. F2 may be a frequency point of a neighboring cell of the terminal device, and the terminal device may perform data transmission with a network device in the neighboring cell based on the frequency point F2.

However, there is a problem that if the serving cell is not synchronized with the neighboring cell, that is, the time of the two cells cannot be completely aligned, the data transmission of the terminal device will generate interference between different frequency points. That is, there is a time difference between the time domain resource T1 maintained by the serving cell and the time domain resource T1 maintained by the neighboring cell, and there is also a time difference between the time domain resource T2 maintained by the serving cell and the time domain resource T2 maintained by the neighboring cell. Then when the terminal device switches from the frequency point F1 to the frequency point F2, it needs to switch from the first time domain resource maintained by the serving cell to the second time domain resource maintained by the neighboring cell to transmit data. In this case, interference in data transmission between the frequency point F1 and the frequency point F2 is caused since there is overlap between the first time domain resource maintained by the serving cell and the second time domain resource maintained by the neighboring cell.

Therefore, the implementation of the present application proposes to adopt following ways to solve the interference problem caused by such asynchrony.

Optionally, the multiple time domain resources include a first time domain resource and a second time domain resource, the first time domain resource is used for data transmission between the terminal device and a first network device based on a first frequency point, the second time domain resource is used for data transmission between the terminal device and a second network device based on a second frequency point, and there is an overlapping time domain resource between the first time domain resource maintained by the first network device and the second time domain resource maintained by the second network device.

Herein, performing, by the terminal device, the data transmission on the multiple time domain resources based on the respective frequency points corresponding to the multiple time domain resources includes: the terminal device performs the data transmission with the first network device on the first time domain resource maintained by the first network device based on the first frequency point, and prohibits data transmission with the second network device on the overlapping time domain resource based on the second frequency point; or the terminal device performs the data transmission with the second network device on the second time domain resource maintained by the second network device based on the second frequency point, and prohibits data transmission with the first network device on the overlapping time domain resource based on the first frequency point.

Specifically, the first indication information received by the terminal device includes the information of the multiple time domain resources, and any two time domain resources in the multiple time domain resources, namely, the time domain resource T1 and the time domain resource T2, respectively correspond to the frequency point F1 and the frequency point F2. The time domain resource T1 is used for data transmission between the terminal device and the first network device based on the frequency point F1, and the time domain resource T2 is used for data transmission between the terminal device and the second network device based on the frequency point F2. The first network device and the second network device may be, for example, access network devices in two cells (such as a serving cell and a neighboring cell), respectively. Under a condition in which the first network device and the second network device is synchronized in time, the terminal device performs data transmission with the first network device based on the frequency point F1 on the time domain resource T1, and performs data transmission with the second network device based on the frequency point F2 on the time domain resource T2.

Figure 8:
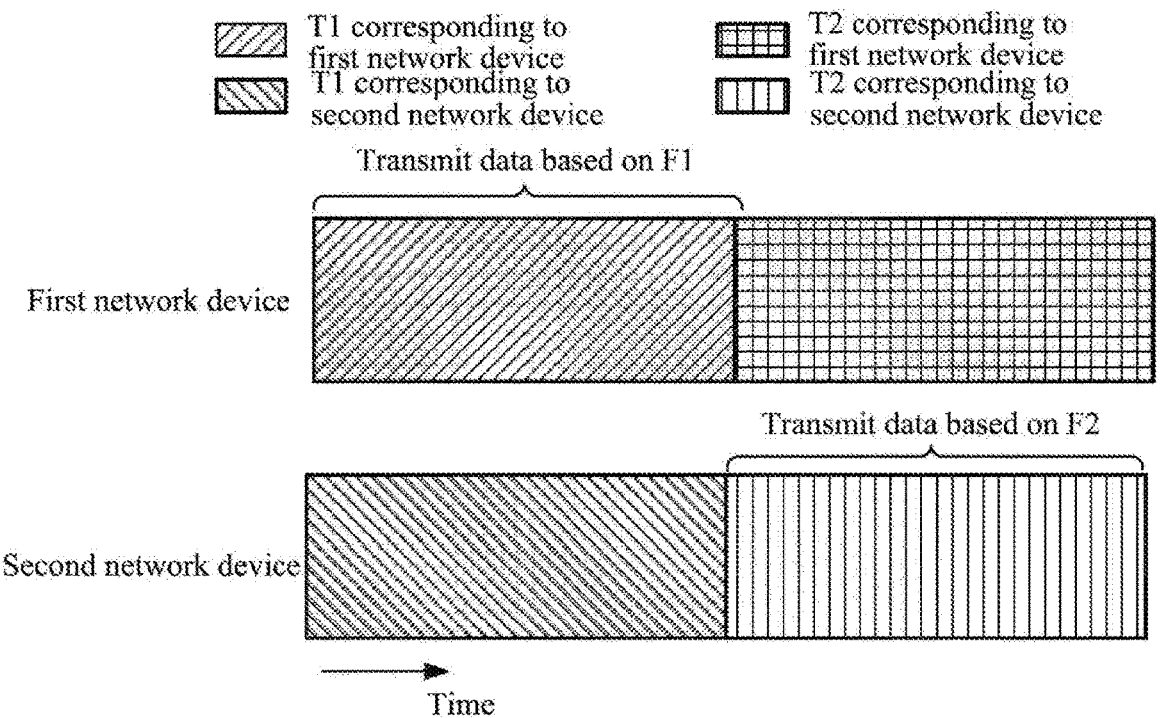
FIG. 8 is a schematic diagram of time domain resources corresponding to different frequency points according to an implementation of the present application.

For example, as shown in FIG. 8, the time domain resource T1 and the time domain resource T2 in the first network device and the second network device are aligned in time. After completing the data transmission with the first network device based on the first frequency point on the time domain resource T1, the terminal device directly switches to the frequency point F2 to transmit data with the second network device on the time domain resource T2.

Figure 9:
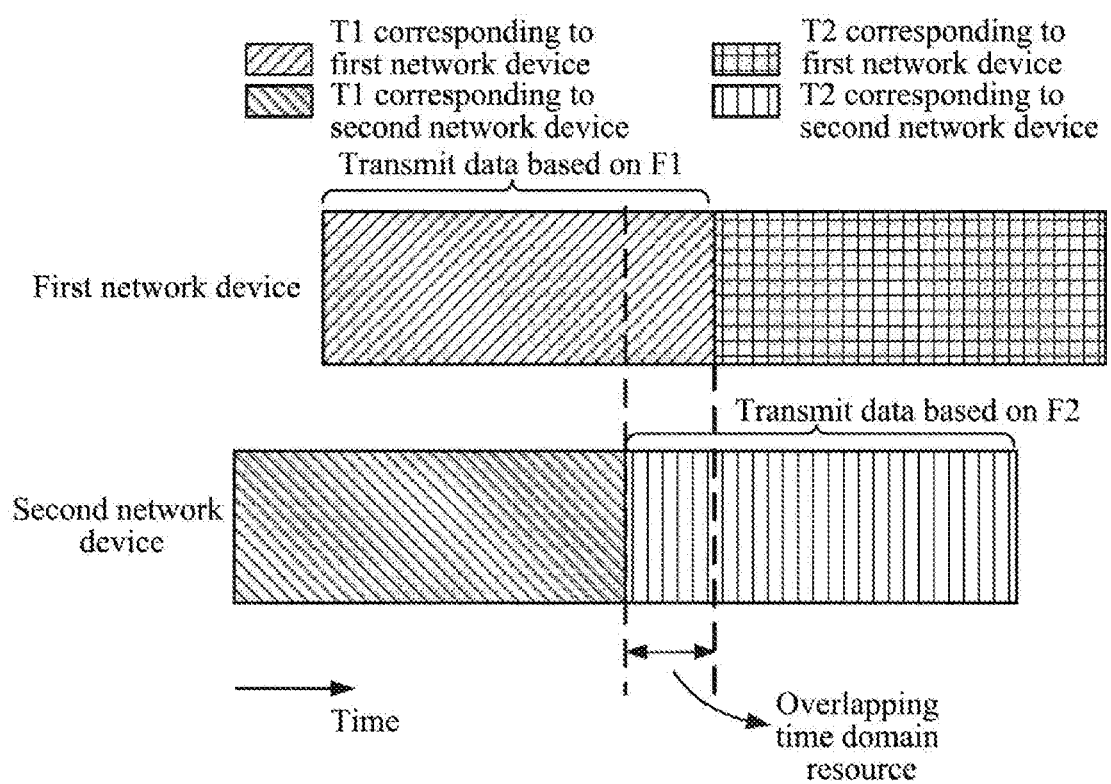
FIG. 9 is a schematic diagram of time domain resources corresponding to different frequency points according to an implementation of the present application.

However, if the first network device and the second network device are not synchronized in time, there is a time difference in time between the time domain resource T1 and the time domain resource T2 in the first network device and the second network device. For example, in the time domain resources shown in FIG. 9, there is an overlapping time domain resource between the first time domain resource maintained by the first network device and the second time domain resource maintained by the second network device. If the terminal device switches to the frequency point F2 to perform data transmission with the second network device after completing data transmission with the first network device based on the first frequency point on the time domain resource T1, then there may be data transmission based on the frequency point F1 and the frequency point F2 simultaneously on the overlapping time domain resource. For example, the first network device sends data to the terminal device on the first time domain resource maintained by the first network device, but the second network device also sends data to the terminal device on the second time domain resource maintained by the second network device, so that there is mutual interference on the overlapping time domain resource.

In the implementation of the present application, the terminal device may perform the data transmission with the first network device on the first time domain resource maintained by the first network device based on the first frequency point, and does not perform data transmission with the second network device on the overlapping time domain resource based on the second frequency point. Optionally, the terminal device does not perform data transmission with the first network device on the overlapping time domain resource based on the first frequency point, but performs data transmission with the second network device on the second time domain resource maintained by the second network device based on the second frequency point.

Figure 10:
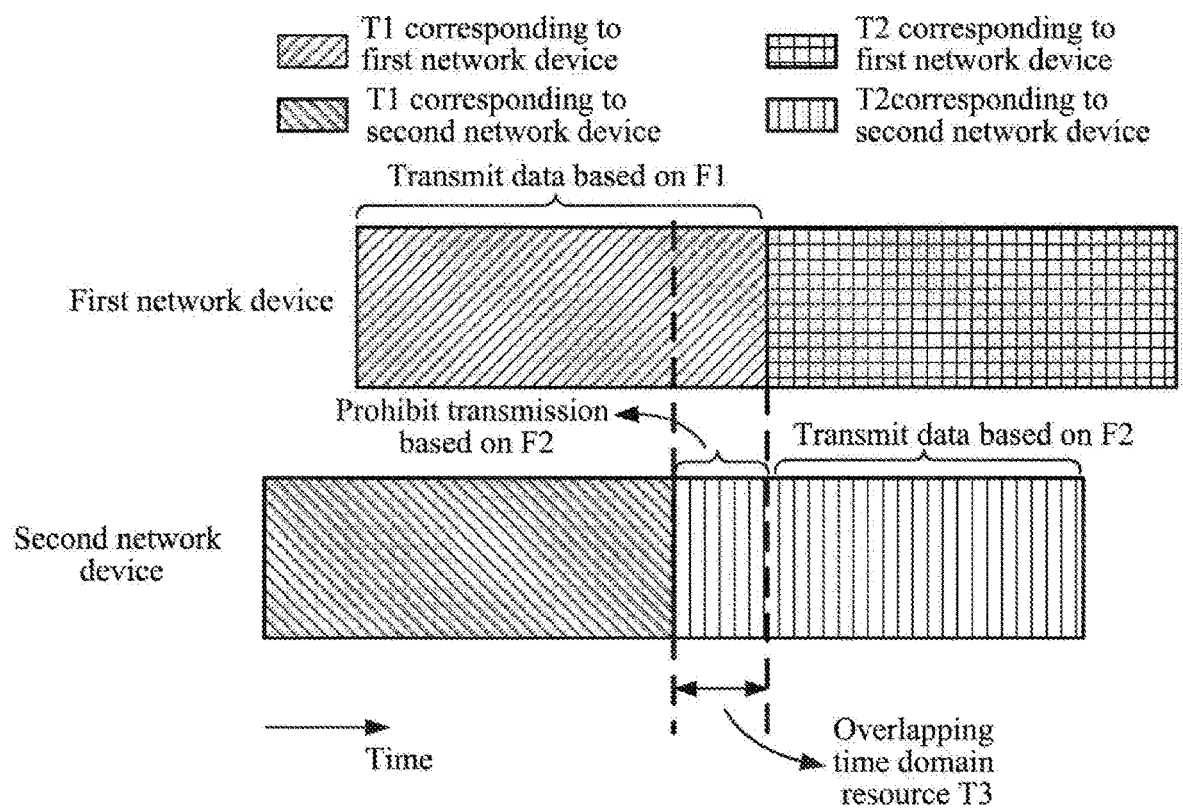
FIG. 10 is a schematic diagram of time domain resources corresponding to different frequency points when there is a time difference according to an implementation of the present application.
Figure 11:
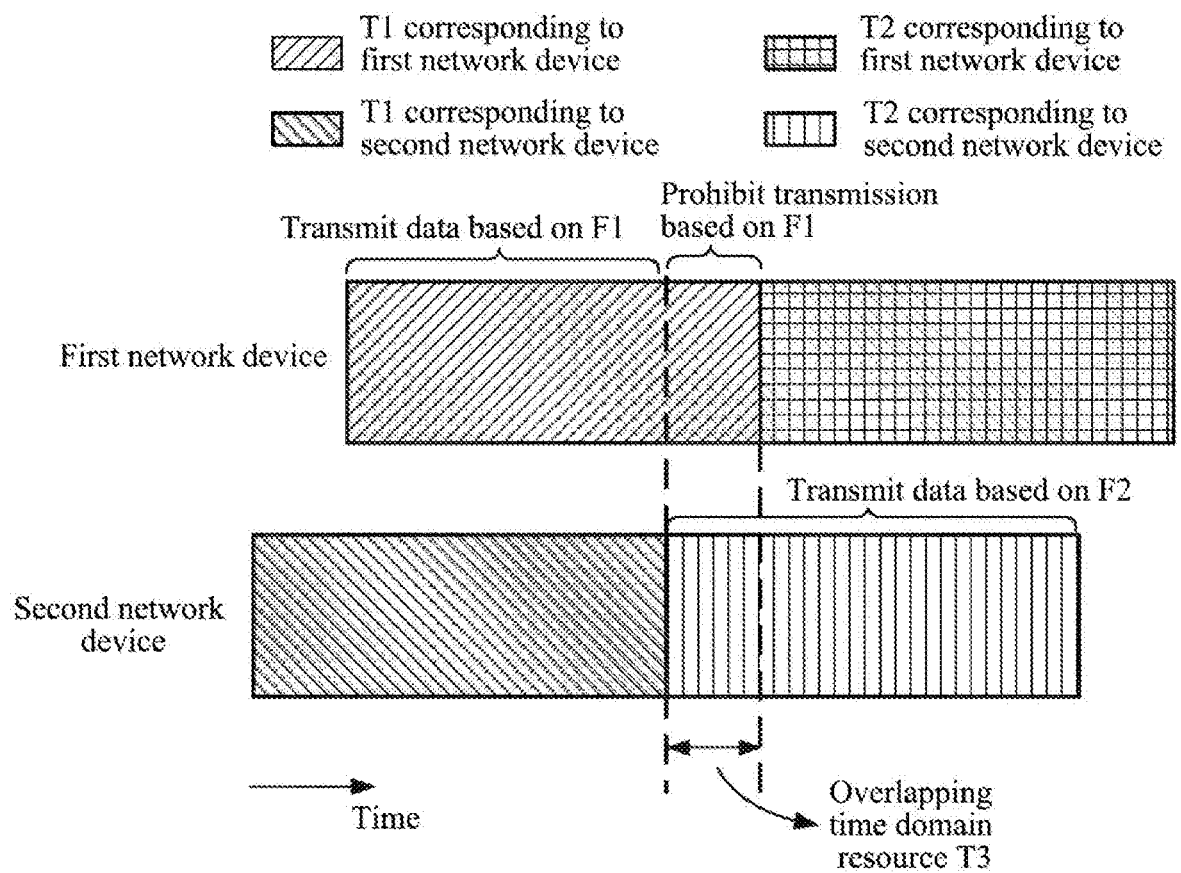
FIG. 11 is a schematic diagram of time domain resources corresponding to different frequency points when there is a time difference according to an implementation of the present application.

For example, for the time domain resources shown in FIG. 10, time maintained by the first network device is earlier than time maintained by the second network device, and a time difference is T3. Therefore, a size of a time domain resource overlapped between the first time domain resource maintained by the first network device and the second time domain resource maintained by the second network device is T3. The terminal device may perform data transmission with the first network device on the first time domain resource maintained by the first network device based on the first frequency point, and the second network device does not schedule the terminal device to transmit data on the time domain resource T3. Optionally, as shown in FIG. 11, the terminal device may transmit data with the first network device on the time domain resource other than T3 in the first time domain resource maintained by the first network device based on the first frequency point, that is, the first network device does not schedule the terminal device to transmit data on the time domain resource T3, so that the terminal device may normally send and receive data scheduled by the second network device on the second time domain resource maintained by the second network device.

Optionally, the method further includes: the terminal device receives second indication information, wherein the second indication information is used for indicating information of the overlapping time domain resource. The information of the overlapping time domain resource includes a position and/or a time domain length of the overlapping time domain resource, which, for example, indicates the time domain resource T3 in FIG. 10 or FIG. 11.

The position of the time domain resource may include a position of a starting symbol and/or a position of an ending symbol of the overlapping time domain resource. The terminal device may determine the overlapping time domain resource according to the position of the starting symbol and the time domain length. Or, the terminal device may determine the overlapping time domain resource according to the position of the starting symbol and the position of the ending symbol. Or, the terminal device may determine the overlapping time domain resource only according to the time domain length, for example, the time domain length of the overlapping time domain resource is equal to two time domain symbols, the last two time domain symbols of the first time domain resource is the time domain resource overlapping with the second time domain resource, and the first two time domain symbols of the second time domain resource is time domain symbols overlapping with the first time domain resource.

Optionally, the multiple time domain resources and/or the overlapping time domain resource are determined through negotiation between multiple network devices communicating with the terminal device. The multiple network devices may include, for example, the first network device and the second network device described above, as well as other network devices. The multiple network devices may jointly determine the multiple time domain resources. The multiple time domain resources may be sent to the terminal device by any one or more of the network devices through the first indication information.

It should be understood that in the implementation of the present application, the information of the multiple time domain resources may be referred to as a resource pattern. The terminal device may perform data reception and/or data sending based on different frequency points according to the pattern.

Optionally, the data transmission includes data reception and/or data sending.

Optionally, receiving, by the terminal device, the first indication information includes: the terminal device receives the first indication information through a Radio Resource Control (RRC) signaling, a Medium Access Control (MAC) signaling, or a physical layer signaling.

Optionally, the information of the multiple time domain resources is determined according to at least one of: dedicated information of the terminal device, a bearer type, and a logical channel type. The dedicated information of the terminal device may be, for example, service information of the terminal device, priority information of the terminal device, device information of the terminal device.

Figure 12:
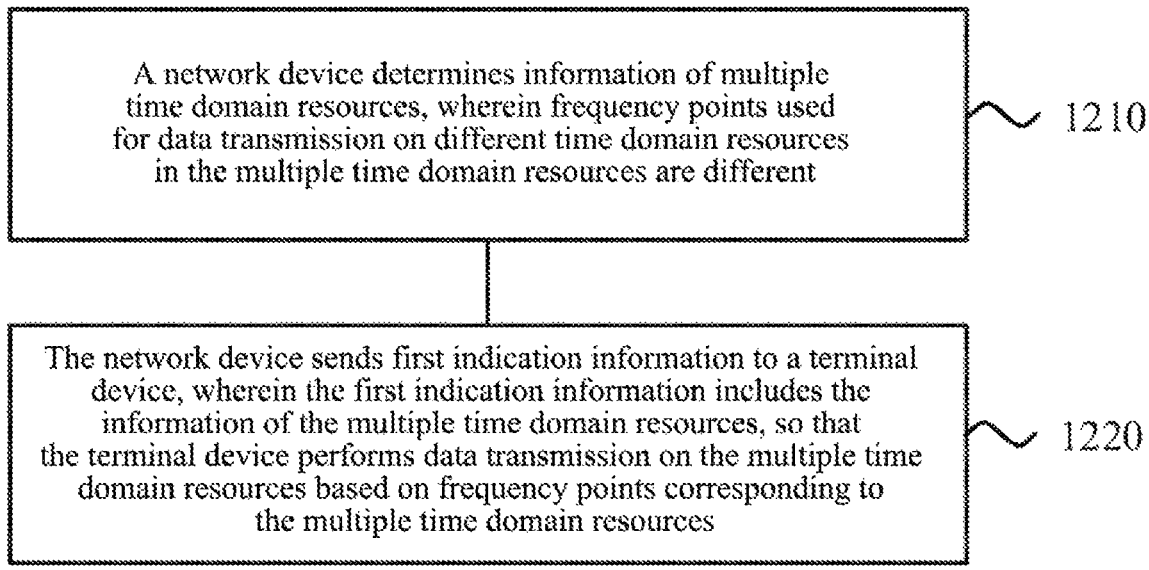
FIG. 12 is a schematic flowchart of a data transmission method according to an implementation of the present application.

FIG. 12 is a schematic flowchart of a data transmission method according to an implementation of the present application. The method shown in the FIG. 12 may be performed by a network device which may be, for example, the network device 10 shown in the FIG. 1. As shown in FIG. 2, the data transmission method includes following acts 1210-1220.

In 1210, a network device determines information of multiple time domain resources, wherein frequency points used for data transmission on different time domain resources in the multiple time domain resources are different.

In 1220, the network device sends first indication information to a terminal device, wherein the first indication information includes the information of the multiple time domain resources, so that the terminal device performs data transmission on the multiple time domain resources based on frequency points corresponding to the multiple time domain resources.

Specifically, the network device determines positions of different time domain resources used for data transmission on different frequency points, and sends indication information to the terminal device, so that the terminal device determines frequency points used for data transmission on different time domain resources according to the information of multiple time domain resources in the indication information, thereby performing data transmission on the multiple time domain resources based on respective frequency points corresponding to the multiple time domain resources. In other words, the time domain resources used when the terminal device transmits data based on different frequency points are different.

Therefore, in the implementation of the present application, the network device configures time domain resources used for data transmission on different frequency points to the terminal device, so that the terminal device may perform data transmission based on different frequency points without increasing the hardware cost and power consumption of the terminal device.

Optionally, the multiple time domain resources are alternately distributed on time domain.

Optionally, the information of the multiple time domain resources includes respective starting positions of the multiple time domain resources on time domain.

Optionally, the information of the multiple time domain resources includes respective time domain lengths of the multiple time domain resources and respective relative positions of the multiple time domain resources.

Optionally, the time domain length of each time domain resource in the multiple s is same or different.

Optionally, each time domain resource in the multiple time domain resources includes multiple time domain units, and the time domain unit includes any one of a radio frame, a subframe, a time slot, a symbol, a Transmission Time Interval.

Optionally, multiple frequency points corresponding to the multiple time domain resources include a frequency point of a serving cell and/or a frequency point of a non-serving cell of the terminal device.

Optionally, the multiple time domain resources include a first time domain resource and a second time domain resource, the first time domain resource is used for data transmission between the terminal device and a first network device based on a first frequency point, the second time domain resource is used for data transmission between the terminal device and a second network device based on a second frequency point, and there is an overlapping time domain resource between the first time domain resource maintained by the first network device and the second time domain resource maintained by the second network device.

The network device is a first network device, and the method further includes: the first network device prohibits data transmission with the terminal device on the overlapping time domain resource based on the first frequency point, so that the terminal device performs data transmission with the second network device on the second time domain resource maintained by the second network device based on the second frequency point.

Specifically, if a cell where the first network device is located is not synchronized in time with a cell where the second network device is located, there is a time difference between the first time domain resource maintained by the first network device and the second time domain resource maintained by the second network device, i.e., there is an overlapping time domain resource between the first time domain resource and the second time domain resource, such as a time domain resource T3 shown in FIGS. 10 and 11. In this case, the first network device may not schedule the data transmission of the terminal device in the overlapping area, but the terminal device performs data transmission with the second network device based on the second frequency point on the overlapping time domain resource. Optionally, the second network device may not schedule the data transmission of the terminal device in the overlapping area, but the terminal device performs data transmission with the first network device based on the first frequency point on the overlapping time domain resource.

Optionally, the method further includes the network device sends second indication information to the terminal device, wherein the second indication information is used for indicating information of the overlapping time domain resource.

Optionally, the information of the overlapping time domain resource includes a position and/or a time domain length of the overlapping time domain resource.

Optionally, the data transmission includes data reception and/or data sending.

Optionally, sending, by the network device, first indication information, includes: the network device sends the first indication information through a radio resource control (RRC) signaling, a medium access control (MAC) signaling, or a physical layer signaling.

Optionally, determining, by the network device, information of the multiple time domain resources, includes: the network device determines the information of the multiple time domain resources according to at least one of: dedicated information of the terminal device, a bearer type, and a logical channel type.

Optionally, the multiple time domain resources and/or the overlapping time domain resource are determined through negotiation between multiple network devices communicating with the terminal device, and the multiple network devices include the network device.

It should be understood that the process of data transmission between the network device and the terminal device may specifically refer to the related description of the terminal device in FIGS. 2 to 11, which will not be repeated here for the sake of brevity.

It should be understood that in various implementations of the present application, values of sequence numbers in the above processes do not indicate an order of execution, and the order of execution of various processes should be determined by their functions and internal logics, and should not constitute any limitation on implementation processes of implementations of the present application.

Figure 13:
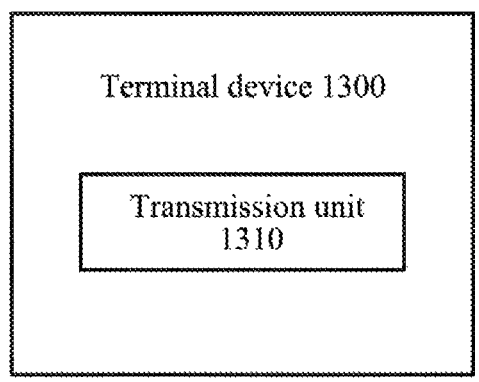
FIG. 13 is a schematic block diagram of a terminal device according to an implementation of the present application.

FIG. 13 is a schematic block diagram of a terminal device 1300 according to an implementation of the present application. As shown in FIG. 13, the terminal device 1300 includes a transmission unit 1310. The transmission unit 1310 is used for: receiving first indication information, wherein the first indication information includes information of multiple time domain resources, wherein frequency points used for data transmission on different time domain resources in the multiple time domain resources are different; and performing data transmission on the multiple time domain resources based on respective frequency points corresponding to the multiple time domain resources.

Therefore, in the implementation of the present application, the terminal device can transmit data based on different frequency points without increasing the hardware cost and power consumption of the terminal device.

Optionally, the multiple time domain resources are alternately distributed on time domain.

Optionally, the information of the multiple time domain resources includes respective starting positions of the multiple time domain resources time domain.

Optionally, the multiple time domain resources constitute one time domain period, and the information of the multiple time domain resources includes a length of the time domain period and respective relative positions of the multiple time domain resources in the time domain period.

Optionally, the time domain length of each time domain resource in the multiple time domain resources is same or different.

Optionally, each time domain resource in the multiple time domain resources includes multiple time domain units, and the time domain unit includes any one of a radio frame, a subframe, a time slot, a symbol, a Transmission Time Interval.

Optionally, multiple frequency points corresponding to the multiple time domain resources include a frequency point of a serving cell and/or a frequency point of a non-serving cell of the terminal device.

Optionally, the multiple time domain resources include a first time domain resource and a second time domain resource, the first time domain resource is used for data transmission between the terminal device and a first network device based on a first frequency point, the second time domain resource is used for data transmission between the terminal device and a second network device based on a second frequency point, and there is an overlapping time domain resource between the first time domain resource maintained by the first network device and the second time domain resource maintained by the second network device.

The transmission unit 1310 is specifically used for performing the data transmission with the first network device on the first time domain resource maintained by the first network device based on the first frequency point, and prohibiting data transmission with the second network device on the overlapping time domain resource based on the second frequency point; or performing the data transmission with the second network device on the second time domain resource maintained by the second network device based on the second frequency point, and prohibiting data transmission with the first network device on the overlapping time domain resource based on the first frequency point.

Optionally, the transmission unit 1310 is further used for receiving second indication information, wherein the second indication information is used for indicating information of the overlapping time domain resource.

Optionally, the information of the overlapping time domain resource includes a position and/or a time domain length of the overlapping time domain resource.

Optionally, the data transmission includes data reception and/or data sending.

Optionally, the transmission unit 1310 is specifically used for receiving the first indication information through a radio resource control (RRC) signaling, a medium access control (MAC) signaling, or a physical layer signaling.

Optionally, the information of the multiple time domain resources is determined according to at least one of: dedicated information of the terminal device, a bearer type, and a logical channel type.

Optionally, the multiple time domain resources and/or the overlapping time domain resource are determined through negotiation between multiple network devices communicating with the terminal device.

Figure 14:
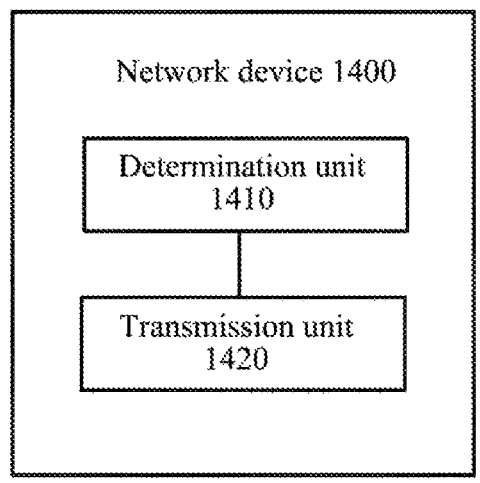
FIG. 14 is a schematic block diagram of a network device according to an implementation of the present application.

FIG. 14 is a schematic block diagram of a network device 1400 according to an implementation of the present application. As shown in FIG. 14, the network device 1400 includes a determination unit 1410 and a transmission unit 1420.

The determination unit 1410 is used for determining information of multiple time domain resources, wherein frequency points used for data transmission on different time domain resources in the multiple time domain resources are different.

The transmission unit 1420 is used for sending first indication information to a terminal device, wherein the first indication information includes the information of the multiple time domain resources, so that the terminal device performs data transmission on the multiple time domain resources based on respective frequency points corresponding to the multiple time domain resources.

Therefore, in the implementation of the present application, the network device configures time domain resources for data transmission on different frequency points to the terminal device, so that the terminal device may perform data transmission based on different frequency points without increasing the hardware cost and power consumption of the terminal device.

Optionally, the multiple time domain resources are alternately distributed on time domain.

Optionally, the information of the multiple time domain resources includes respective starting positions of the multiple time domain resources on time domain.

Optionally, the multiple time domain resources constitute one time domain period, and the information of the multiple time domain resources includes a length of the time domain period and respective relative positions of the multiple time domain resources in the time domain period.

Optionally, the time domain length of each time domain resource in the multiple time domain resources is same or different.

Optionally, each time domain resource in the multiple time domain resources includes multiple time domain units, and the time domain unit includes any one of a radio frame, a subframe, a time slot, a symbol, a Transmission Time Interval.

Optionally, multiple frequency points corresponding to the multiple time domain resources include a frequency point of a serving cell and/or a frequency point of a non-serving cell of the terminal device.

Optionally, the multiple time domain resources include a first time domain resource and a second time domain resource, the first time domain resource is used for data transmission between the terminal device and a first network device based on a first frequency point, the second time domain resource is used for data transmission between the terminal device and a second network device based on a second frequency point, and there is an overlapping time domain resource between the first time domain resource maintained by the first network device and the second time domain resource maintained by the second network device.

The network device is a first network device, and the transmission unit 1420 is further used for prohibiting data transmission with the terminal device on the overlapping time domain resource based on the first frequency point, so that the terminal device performs data transmission with the second network device on the second time domain resource maintained by the second network device based on the second frequency point.

Optionally, the transmission unit 1420 is further used for sending second indication information to the terminal device, and the second indication information is used for indicating information of the overlapping time domain resource.

Optionally, the information of the overlapping time domain resource includes a position and/or a time domain length of the overlapping time domain resource.

Optionally, the data transmission includes data reception and/or data sending.

Optionally, the transmission unit 1420 is specifically used for sending the first indication information through a radio resource control (RRC) signaling, a medium access control (MAC) signaling, or a physical layer signaling.

Optionally, the determination unit 1410 is specifically used for determining the information of the multiple time domain resources according to at least one of: dedicated information of the terminal device, a bearer type, and a logical channel type.

Optionally, the multiple time domain resources and/or the overlapping time domain resource are determined through negotiation between multiple network devices communicating with the terminal device, and the multiple network devices include the network device.

Figure 15:
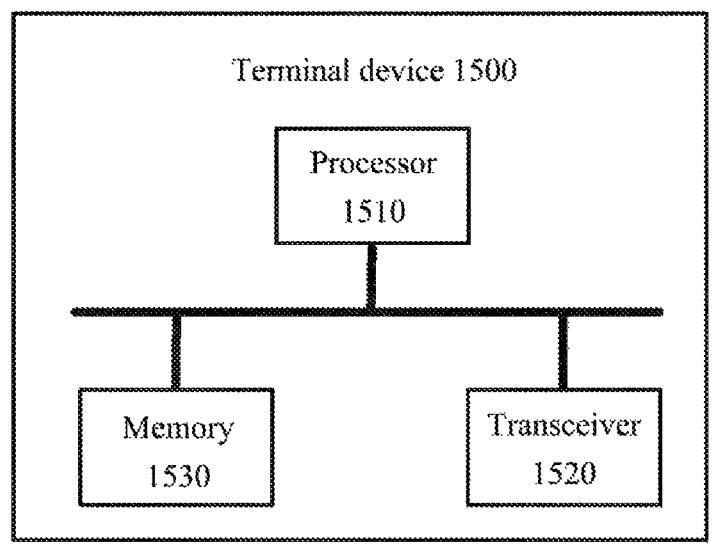
FIG. 15 is a schematic diagram of structure of a terminal device according to an implementation of the present application.

FIG. 15 is a schematic diagram of structure of a terminal device 1500 according to an implementation of the present application. As shown in FIG. 15, the terminal device includes a processor 1510, a transceiver 1520, and a memory 1530. The processor 1510, the transceiver 1520, and the memory 1530 communicate with each other through an internal connection path. The memory 1530 is used for storing instructions, and the processor 1510 is used for executing instructions stored in the memory 1530 to control the transceiver 1520 to send or receive signals. The transceiver 1520 is used for receiving first indication information, wherein the first indication information includes information of multiple time domain resources, wherein frequency points used for data transmission on different time domain resources in the multiple time domain resources are different; and performing data transmission on the multiple time domain resources based on respective frequency points corresponding to the multiple time domain resources.

Therefore, in the implementation of the present application, the terminal device can transmit data based on different frequency points without increasing the hardware cost and power consumption of the terminal device.

Optionally, the multiple time domain resources are alternately distributed on time domain.

Optionally, the information of the multiple time domain resources includes respective time domain starting positions of the multiple time domain resources.

Optionally, the multiple time domain resources constitute one time domain period, and the information of the multiple time domain resources includes a length of the time domain period and respective relative positions of the multiple time domain resources in the time domain period.

Optionally, the time domain length of each time domain resource in the multiple time domain resources is same or different.

Optionally, each time domain resource in the multiple time domain resources includes multiple time domain units, and the time domain unit includes any one of a radio frame, a subframe, a time slot, a symbol, a Transmission Time Interval.

Optionally, multiple frequency points corresponding to the multiple time domain resources include a frequency point of a serving cell and/or a frequency point of a non-serving cell of the terminal device.

Optionally, the multiple time domain resources include a first time domain resource and a second time domain resource, the first time domain resource is used for data transmission between the terminal device and a first network device based on a first frequency point, the second time domain resource is used for data transmission between the terminal device and a second network device based on a second frequency point, and there is an overlapping time domain resource between the first time domain resource maintained by the first network device and the second time domain resource maintained by the second network device.

The transceiver 1520 is specifically used for performing the data transmission with the first network device on the first time domain resource maintained by the first network device based on the first frequency point, and prohibiting data transmission with the second network device on the overlapping time domain resource based on the second frequency point; or performing the data transmission with the second network device on the second time domain resource maintained by the second network device based on the second frequency point, and prohibiting data transmission with the first network device on the overlapping time domain resource based on the first frequency point.

Optionally, the transceiver 1520 is further used for receiving second indication information, wherein the second indication information is used for indicating information of the overlapping time domain resource.

Optionally, the information of the overlapping time domain resource includes a position and/or a time domain length of the overlapping time domain resource.

Optionally, the data transmission includes data reception and/or data sending.

Optionally, the transceiver 1520 is specifically used for receiving the first indication information through a radio resource control (RRC) signaling, a medium access control (MAC) signaling, or a physical layer signaling.

Optionally, the information of the multiple time domain resources is determined according to at least one of: dedicated information of the terminal device, a bearer type, and a logical channel type.

Optionally, the multiple time domain resources and/or the overlapping time domain resource are determined through negotiation between multiple network devices communicating with the terminal device.

It should be understood that, in an implementation of the present application, the processor 1510 may be a central processing unit (CPU), or the processor 1510 may be other general purpose processor, a digital signal processor (DSP), an application specific integrated circuit (ASIC), a field programmable gate array (FPGA) or other programmable logic device, a discrete gate or a transistor logic device, or a discrete hardware component, etc. The general purpose processor may be a microprocessor or the processor may be any conventional processor or the like.

The memory 1530 may include a read-only memory and a random access memory, and provide instructions and data to the processor 1510. A portion of memory 1530 may include a non-volatile random access memory.

In an implementation process, the acts of the methods described above may be accomplished by integrated logic circuits of hardware in the processor 1510 or instructions in a form of software. The acts of the data transmission method disclosed in the implementation of the present application may be directly accomplished by an execution of a hardware processor or accomplished by a combination of hardware and software modules in the processor 1510. The software modules may be located in a storage medium commonly used in the art, such as a random access memory, flash memory, read-only memory, programmable read-only memory or electrically erasable programmable memory, or register. The storage medium is located in the memory 1530, and the processor 1510 reads the information in the memory 1530 and accomplishes the acts of the above method in combination with its hardware. In order to avoid repetition, it will not be described in detail here.

The terminal device 1500 according to the implementation of the present application may correspond to the terminal device for executing the method 200 in the method 200 and the terminal device 1300 according to the implementation of the present application, and various units or modules in the terminal device 1500 are respectively used for executing various actions or processing processes executed by the terminal device in the method 200. Here, in order to avoid redundancy, detailed description thereof is omitted.

Figure 16:
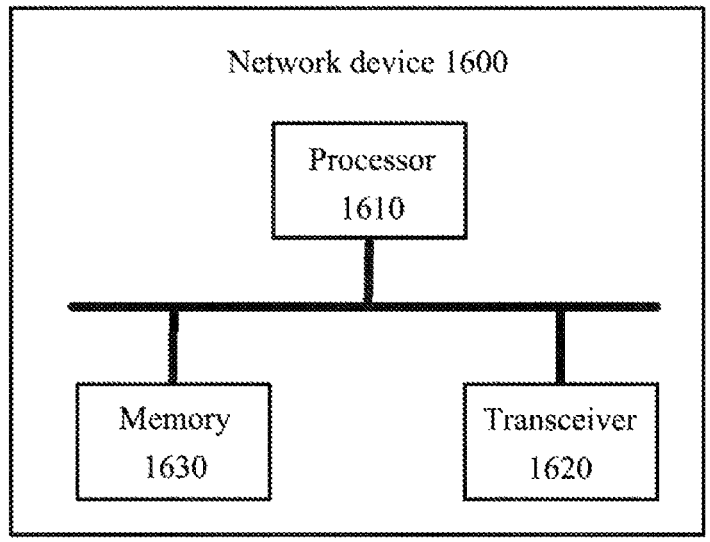
FIG. 16 is a schematic diagram of structure of a network device according to an implementation of the present application.

FIG. 16 is a schematic diagram of structure of a network device 1600 according to an implementation of the present application. As shown in FIG. 16, the network device includes a processor 1610, a transceiver 1620, and a memory 1630. The processor 1610, the transceiver 1620, and the memory 1630 communicate with each other through an internal connection path. The memory 1630 is used for storing instructions, and the processor 1610 is used for executing instructions stored in the memory 1630 to control the transceiver 1620 to send or receive signals. Herein, the processor 1610 is used for determining information of multiple time domain resources, wherein frequency points used for data transmission on different time domain resources in the multiple time domain resources are different.

The transceiver 1620 is used for sending first indication information to a terminal device, wherein the first indication information includes the information of the multiple time domain resources, so that the terminal device performs data transmission on the multiple time domain resources based on respective frequency points corresponding to the multiple time domain resources.

Therefore, in the implementation of the present application, the network device configures time domain resources used for data transmission on different frequency points to the terminal device, so that the terminal device may perform data transmission based on different frequency points without increasing the hardware cost and power consumption of the terminal device.

Optionally, the multiple time domain resources are alternately distributed on time domain.

Optionally, the information of the multiple time domain resources includes respective time domain starting positions of the multiple time domain resources.

Optionally, the multiple time domain resources constitute one time domain period, and the information of the multiple time domain resources includes a length of the time domain period and respective relative positions of the multiple time domain resources in the time domain period.

Optionally, the time domain length of each time domain resource in the multiple time domain resources is same or different.

Optionally, each time domain resource in the multiple time domain resources includes multiple time domain units, and the time domain unit includes any one of a radio frame, a subframe, a time slot, a symbol, a Transmission Time Interval.

Optionally, multiple frequency points corresponding to the multiple time domain resources include a frequency point of a serving cell and/or a frequency point of a non-serving cell of the terminal device.

Optionally, the multiple time domain resources include a first time domain resource and a second time domain resource, the first time domain resource is used for data transmission between the terminal device and a first network device based on a first frequency point, the second time domain resource is used for data transmission between the terminal device and a second network device based on a second frequency point, and there is an overlapping time domain resource between the first time domain resource maintained by the first network device and the second time domain resource maintained by the second network device.

The transceiver 1620 is used for prohibiting data transmission with the terminal device on the overlapping time domain resource based on the first frequency point, so that the terminal device performs data transmission with the second network device on the second time domain resource maintained by the second network device based on the second frequency point.

Optionally, the transceiver 1620 is further used for sending second indication information to the terminal device, and the second indication information is used for indicating information of the overlapping time domain resource.

Optionally, the information of the overlapping time domain resource includes a position and/or time domain length of the overlapping time domain resource.

Optionally, the data transmission includes data reception and/or data sending.

Optionally, the transceiver 1620 is specifically used for sending the first indication information through a radio resource control (RRC) signaling, a medium access control (MAC) signaling, or a physical layer signaling.

Optionally, the processor 1610 is specifically used for determining the information of the multiple time domain resources according to at least one of: dedicated information of the terminal device, a bearer type, and a logical channel type.

Optionally, the multiple time domain resources and/or the overlapping time domain resource are determined through negotiation between multiple network devices communicating with the terminal device, and the multiple network devices include the network device.

It should be understood that in the implementation of the present application, the processor 1610 may be a Central Processing Unit (CPU), or the processor 1610 may be other general purpose processors, a digital signal processor (DSP), an application specific integrated circuit (ASIC), a Field programmable gate array (FPGA) or other programmable logic devices, a discrete gate or a transistor logic device, a discrete hardware component, etc. The general purpose processor may be a microprocessor or the processor may be any conventional processor or the like.

The memory 1630 may include a read-only memory and a random access memory, and provide instructions and data to the processor 1610. A portion of the memory 1630 may further include a non-volatile random access memory. In an implementation process, the acts of the methods described above may be accomplished by integrated logic circuits of hardware in the processor 1610 or instructions in a form of software. The acts of the data transmission method disclosed in the implementation of the present application may be directly accomplished by an execution of a hardware processor or accomplished by a combination of hardware and software modules in the processor 1610. The software modules may be located in a storage medium commonly used in the art, such as a random access memory, a flash memory, a read-only memory, a programmable read-only memory or an electrically erasable programmable memory, or a register. The storage medium is located in the memory 1630, and the processor 1610 reads the information in the memory 1630 and accomplishes the acts of the above method in combination with its hardware. In order to avoid repetition, it will not be described in detail here.

The network device 1600 according to the implementation of the present application may correspond to the network device for executing the method 1200 in the method 1200 and the network device 1400 according to the implementation of the present application, and various units or modules in the network device 1600 are respectively used for executing various actions or processing processes executed by the network device in the method 1200. Here, in order to avoid redundancy, detailed description thereof is omitted.

Figure 17:
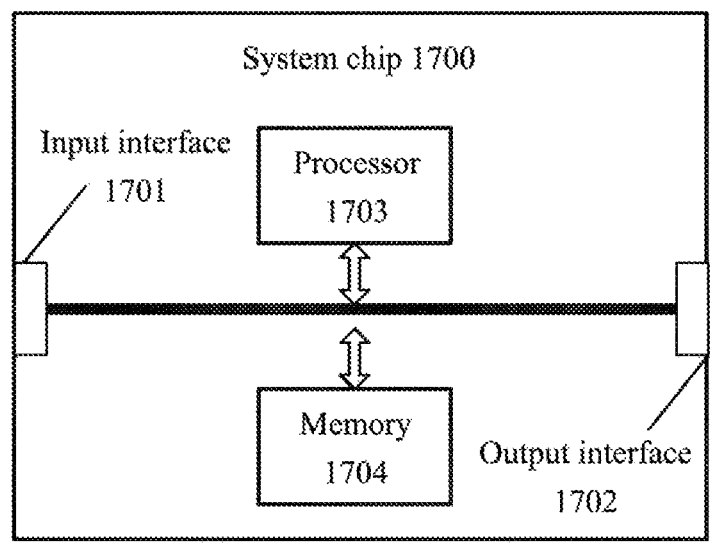
FIG. 17 is a schematic diagram of structure of a system chip according to an implementation of the present application.

FIG. 17 is a schematic diagram of structure of a system chip according to an implementation of the present application. The system chip 1700 of FIG. 17 includes an input interface 1701, an output interface 1702, at least one processor 1703, and a memory 1704. The input interface 1701, the output interface 1702, the processor 1703, and the memory 1704 are connected to each other through an internal connection path. The processor 1703 is used for executing codes in the memory 1704.

Optionally, the processor 1703 may implement the method 200 executed by the terminal device in the method implementation when the codes are executed. For the sake of brevity, it will not be repeated here.

Optionally, the processor 1703 may implement the method 1200 executed by the network device in the method implementation when the codes are executed. For the sake of brevity, it will not be repeated here.

Those of ordinary skill in the art will recognize that the example units and algorithm acts described in connection with the implementations disclosed herein may be implemented in electronic hardware, or a combination of computer software and electronic hardware. Whether these functions are implemented in hardware or software depends on a specific application and design constraint of the technical solution. Skilled in the art may use different manners to realize the described functions for each particular application, but such realization should not be considered to be beyond the scope of the present application.

Those skilled in the art may clearly understand that for convenience and conciseness of description, the specific working process of the system, device and unit described above may refer to the corresponding process in the implementations of methods described above, and details are not described herein again.

In several implementations provided by the present application, it should be understood that the disclosed systems, devices and methods may be implemented in other ways. For example, the apparatus implementation described above is only illustrative, for example, the division of the unit is only a logical function division, and there may be other ways of division in actual implementation, for example, multiple units or components may be combined or integrated into another system, or some features may be ignored or not executed. On the other hand, the mutual coupling or direct coupling or communication connection shown or discussed may be indirect coupling or communication connection through some interfaces, devices or units, and may be in electrical, mechanical or other forms.

The unit described as a separate component may or may not be physically separated, and the component shown as a unit may or may not be a physical unit, i.e., may be located in one place or may be distributed over multiple network units. Some or all of the units may be selected according to practical needs to achieve a purpose of the solution of the implementations.

In addition, various functional units in various implementations of the present application may be integrated in one monitoring unit, or various units may be physically present separately, or two or more units may be integrated in one unit.

The functions may be stored in a computer readable storage medium if implemented in a form of software functional units and sold or used as a separate product. Based on this understanding, the technical solution of the present application, in essence, or the part contributing to the existing art, or the part of the technical solution, may be embodied in the form of a software product stored in a storage medium, including several instructions for causing a computer device (which may be a personal computer, a server, or a network device, etc.) to perform all or part of the acts of the methods described in various implementations of the present application. The aforementioned storage medium includes various media capable of storing program codes, such as a U disk, a mobile hard disk, a read-only memory (ROM), a random access memory (RAM), a magnetic disk, or an optical disk.

What are described above are merely example implementations of the present application, but the protection scope of the present application is not limited thereto. Any variation or substitution that may be easily conceived by a person skilled in the art within the technical scope disclosed by the present application shall be included within the protection scope of the present application. Therefore, the protection scope of the implementations of the present application should be based on the protection scope of the claims.

The invention claimed is:

1. A method for data transmission, comprising:
receiving, by a terminal device, first indication information, wherein the first indication information comprises information of a plurality of time domain resources, wherein frequency points used for data transmission on different time domain resources in the plurality of time domain resources are different; and
performing, by the terminal device, data transmission on the plurality of time domain resources based on frequency points corresponding to the plurality of time domain resources,
wherein the plurality of time domain resources comprise a first time domain resource and a second time domain resource, the first time domain resource is used for data transmission between the terminal device and a first network device based on a first frequency point, the second time domain resource is used for data transmission between the terminal device and a second network device based on a second frequency point, and there is an overlapping time domain resource between the first time domain resource maintained by the first network device and the second time domain resource maintained by the second network device, and wherein, performing, by the terminal device, the data transmission on the plurality of time domain resources based on the frequency points corresponding to the plurality of time domain resources comprises:

performing, by the terminal device, the data transmission with the first network device on the first time domain resource maintained by the first network device based on the first frequency point, and prohibiting data transmission with the second network device on the overlapping time domain resource based on the second frequency point; or performing, by the terminal device, the data transmission with the second network device on the second time domain resource maintained by the second network device based on the second frequency point, and prohibiting data transmission with the first network device on the overlapping time domain resource based on the first frequency point.

2. The method according to claim 1, wherein the information of the plurality of time domain resources comprises starting positions of the plurality of time domain resources on time domain.

3. The method according to claim 1, wherein the plurality of time domain resources constitute one time domain period, and the information of the plurality of time domain resources comprises a length of the time domain period and respective relative positions of the plurality of time domain resources in the time domain period.

4. The method according to claim 1, wherein each time domain resource in the plurality of time domain resources comprises a plurality of time domain units, and the time domain unit comprises any one of:

a radio frame, a subframe, a time slot, a symbol, and a transmission time interval.

5. The method according to claim 1, wherein at least one of the plurality of time domain resources or the overlapping time domain resource is determined through negotiation between a plurality of network devices communicating with the terminal device.

6. A method for data transmission, comprising:

determining, by a network device, information of a plurality of time domain resources, wherein frequency points used for data transmission on different time domain resources in the plurality of time domain resources are different;

sending, by the network device, first indication information to a terminal device, wherein the first indication information comprises the information of the plurality of time domain resources, to enable the terminal device to perform data transmission on the plurality of time domain resources based on frequency points corresponding to the plurality of time domain resources, wherein the plurality of time domain resources comprise a first time domain resource and a second time domain resource, wherein the first time domain resource is used for data transmission between the terminal device and a first network device based on a first frequency point, wherein the second time domain resource is used for data transmission between the terminal device and a second network device based on a second frequency point, wherein there is an overlapping time domain resource between the first time domain resource maintained by the first network device and the second time domain resource maintained by the second network device, and wherein the network device is the first network device; and prohibiting, by the first network device, data transmission with the terminal device on the overlapping time domain resource based on the first frequency point, to enable the terminal device to perform data transmission with the second network device on the second time domain resource maintained by the second network device based on the second frequency point.

7. The method according to claim 6, wherein the information of the plurality of time domain resources comprises starting positions of the plurality of time domain resources on time domain.

8. The method according to claim 6, wherein the plurality of time domain resources constitute one time domain period, and the information of the plurality of time domain resources comprises a length of the time domain period and relative positions of the plurality of time domain resources in the time domain period.

9. The method according to claim 6, wherein each time domain resource in the plurality of time domain resources comprises a plurality of time domain units, and the time domain unit comprises any one of:

a radio frame, a subframe, a time slot, a symbol, and a transmission time interval.

10. The method claim 6, wherein at least one of the plurality of time domain resources or the overlapping time domain resource are determined through negotiation between a plurality of network devices communicating with the terminal device, and the plurality of network devices comprises the network device.

11. A terminal device, comprising: a memory, a processor, and a transceiver;

wherein the memory is used for storing instructions;

wherein the processor is used for executing the instructions stored in the memory to control the transceiver to send or receive signals;

wherein the transceiver is used for receiving first indication information, wherein the first indication information comprises information of a plurality of time domain resources, wherein frequency points used for data transmission on different time domain resources in the plurality of time domain resources are different;

wherein the transceiver is further used for performing data transmission on the plurality of time domain resources based on frequency points corresponding to the plurality of time domain resources;

wherein the plurality of time domain resources comprise a first time domain resource and a second time domain resource, wherein the first time domain resource is used for data transmission between the terminal device and a first network device based on a first frequency point, wherein the second time domain resource is used for data transmission between the terminal device and a second network device based on a second frequency point, and wherein there is an overlapping time domain resource between the first time domain resource maintained by the first network device and the second time domain resource maintained by the second network device; and wherein the transceiver is further used for:

performing the data transmission with the first network device on the first time domain resource maintained by the first network device based on the first frequency point, and prohibiting data transmission with the second network device on the overlapping time domain resource based on the second frequency point; or performing the data transmission with the second network device on the second time domain resource maintained by the second network device based on the second frequency point, and prohibiting data transmission with the first network device on the overlapping time domain resource based on the first frequency point.

12. The terminal device according to claim 11, wherein the information of the plurality of time domain resources comprises starting positions of the plurality of time domain resources on time domain.

13. The terminal device according to claim 11, wherein the plurality of time domain resources constitute one time domain period, and the information of the plurality of time domain resources comprises a length of the time domain period and relative positions of the plurality of time domain resources in the time domain period.

14. The terminal device according to claim 11, wherein each time domain resource in the plurality of time domain resources comprises a plurality of time domain units, and the time domain unit comprises any one of:
  a radio frame, a subframe, a time slot, a symbol, or a transmission time interval.

15. The terminal device according to claim 11, wherein the plurality of time domain resources are determined through negotiation between a plurality of network devices communicating with the terminal device.

16. A network device, comprising: a memory, a processor, and a transceiver;
  wherein the memory is used for storing instructions;
  wherein the processor is used for executing instructions stored in the memory to control the transceiver to send or receive signals;
  wherein the processor is further used for determining information of a plurality of time domain resources, wherein frequency points used for data transmission on different time domain resources in the plurality of time domain resources are different;
  wherein the transceiver is used for sending first indication information to a terminal device, wherein the first indication information comprises the information of the plurality of time domain resources, to enable the terminal device to perform data transmission on the plurality of time domain resources based on frequency points corresponding to the plurality of time domain resources;
  wherein the plurality of time domain resources comprise a first time domain resource and a second time domain resource, wherein the first time domain resource is used for data transmission between the terminal device and a first network device based on a first frequency point, wherein the second time domain resource is used for data transmission between the terminal device and a second network device based on a second frequency point, and wherein there is an overlapping time domain resource between the first time domain resource maintained by the first network device and the second time domain resource maintained by the second network device;
  wherein the network device is the first network device; and
  wherein the transceiver is further used for prohibiting data transmission with the terminal device on the overlapping time domain resource based on the first frequency point to enable the terminal device to perform data transmission with the second network device on the second time domain resource maintained by the second network device based on the second frequency point.

17. The network device according to claim 16, wherein the information of the plurality of time domain resources comprises starting positions of the plurality of time domain resources on time domain.

18. The network device according to claim 16, wherein the plurality of time domain resources constitute one time domain period, and the information of the plurality of time domain resources comprises a length of the time domain period and relative positions of the plurality of time domain resources in the time domain period.

19. The network device according to claim 16, wherein each time domain resource in the plurality of time domain resources comprises a plurality of time domain units, and the time domain unit comprises any one of:
  a radio frame, a subframe, a time slot, a symbol, or a transmission time interval.

20. The network device according to claim 16, wherein at least one of the plurality of time domain resources or the overlapping time domain resource are determined through negotiation between a plurality of network devices communicating with the terminal device, and the plurality of network devices comprise the network device.

* * * * *